(12) United States Patent
Aurich et al.

(10) Patent No.: US 7,009,134 B2
(45) Date of Patent: Mar. 7, 2006

(54) ELECTRODE GUIDE FOR SPARK-EROSION MACHINES AND A METHOD FOR THE SPARK-EROSION OF WORKPIECES

(75) Inventors: Stephan Aurich, Neukirchen (DE); Carsten Brandt, Chemnitz (DE); Wilhelm Frank, Bambeg (DE); Rüdiger Gam, Chemnitz (DE); Jens Hömig, Chemnitz (DE)

(73) Assignee: Siemens Aktiengesellschaft, Munich (DE)

(*) Notice: Subject to any disclaimer, the term of this patent is extended or adjusted under 35 U.S.C. 154(b) by 143 days.

(21) Appl. No.: 10/624,341

(22) Filed: Jul. 22, 2003

(65) Prior Publication Data

US 2004/0056004 A1    Mar. 25, 2004

Related U.S. Application Data

(63) Continuation of application No. PCT/DE02/00260, filed on Jan. 25, 2002.

(30) Foreign Application Priority Data

Jan. 25, 2001  (DE) .............................. 101 03 292

(51) Int. Cl.
*B23H 1/00*  (2006.01)
*B23H 7/26*  (2006.01)

(52) U.S. Cl. ................................. 219/69.15
(58) Field of Classification Search ............ 219/69.12, 219/69.15, 69.17, 69.2
See application file for complete search history.

(56) References Cited

U.S. PATENT DOCUMENTS

| 4,782,203 | A | * | 11/1988 | Check et al. | 219/69.15 |
| 4,896,012 | A | * | 1/1990 | Barbulescu | 219/69.12 |
| 5,045,661 | A | * | 9/1991 | Gamo et al. | 219/69.12 |
| 5,086,202 | A | * | 2/1992 | Iwasaki et al. | 219/69.12 |
| 5,214,260 | A | * | 5/1993 | Fricke | 219/69.12 |
| 5,391,850 | A |   | 2/1995 | Mueller | 219/69.2 |
| 5,951,883 | A |   | 9/1999 | Barbulescu | 219/69.15 |

FOREIGN PATENT DOCUMENTS

| DE | DT 2207718 | 9/1972 |
| DE | 2019903 | 4/1973 |
| DE | DT 27 04 945 A1 | 8/1977 |
| DE | 35 37 188 A1 | 4/1986 |
| DE | 38 15 576 A1 | 11/1989 |
| DE | 24 37 602 C2 | 9/1994 |
| DE | 195 48 001 A1 | 6/1997 |
| DE | 198 04 371 A1 | 8/1998 |
| DE | 197 58 192 C2 | 5/2000 |
| EP | 0 286 779 A2 | 1/1988 |
| GB | 2 246 975 A | 8/1990 |
| JP | 56015933 | 2/1981 |
| JP | 57033922 | 2/1982 |
| JP | 60067032 | 4/1985 |
| JP | 63-62617 A * | 3/1988 |
| JP | 63-312024 A * | 12/1988 |

* cited by examiner

*Primary Examiner*—Geoffrey S. Evans
(74) *Attorney, Agent, or Firm*—Baker Botts L.L.P.

(57) ABSTRACT

An electrode guide and a method for the spark-erosion of workpieces are disclosed. The electrode guide (1), consisting of a two-piece prism-shaped (2, 3) guide with a pretensioning device (6), enables an electrode (4) to be guided in a play-free manner, thus allowing the production of bores that is accurate to within 1 μm. A pivoting device (10) for pivoting the electrode guide and an alignment device (14) for the parallel displacement of the electrode guide (1) are also provided, enabling the production of conical bores.

24 Claims, 4 Drawing Sheets

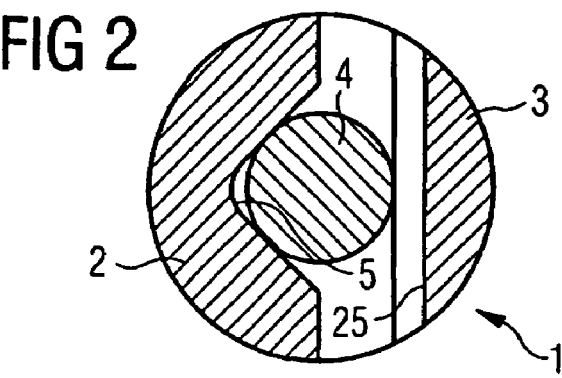
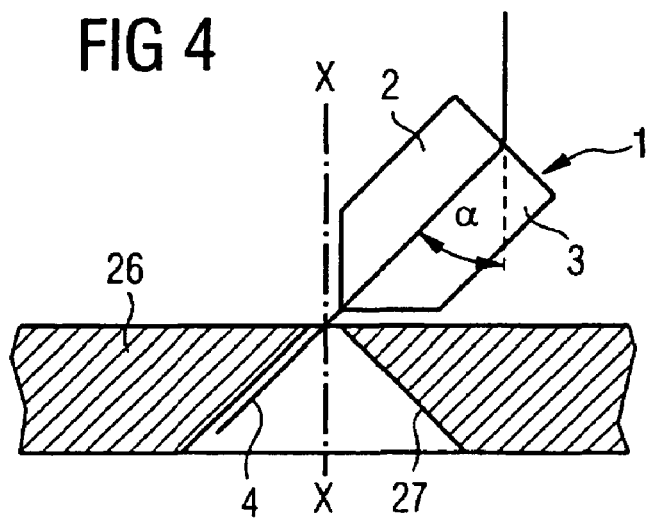
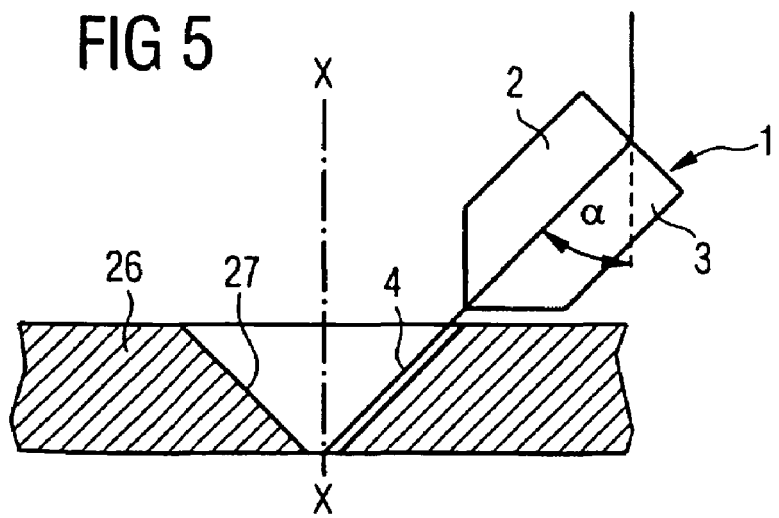

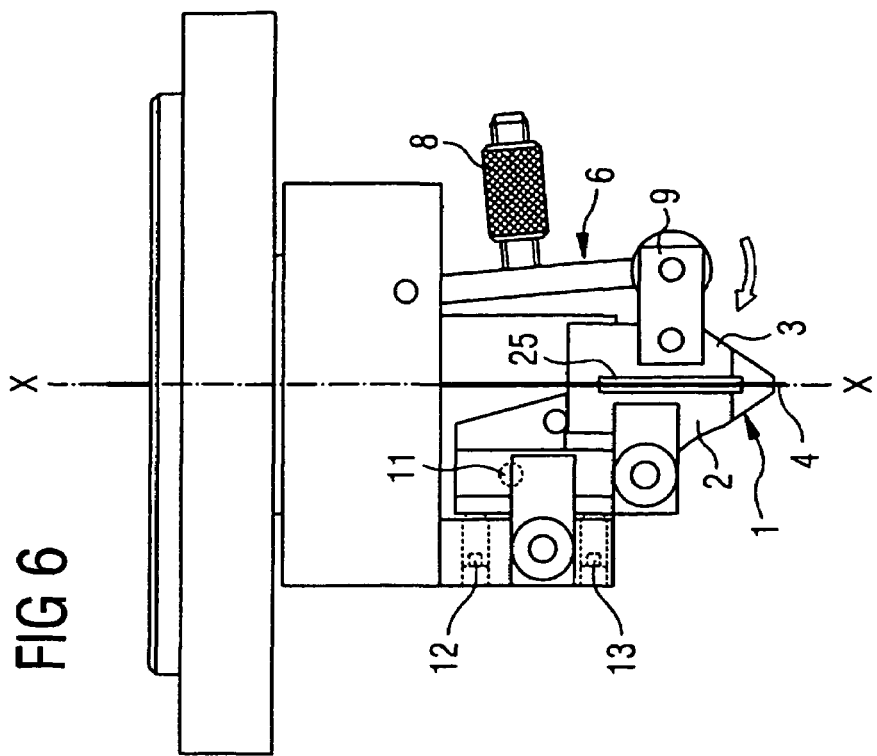
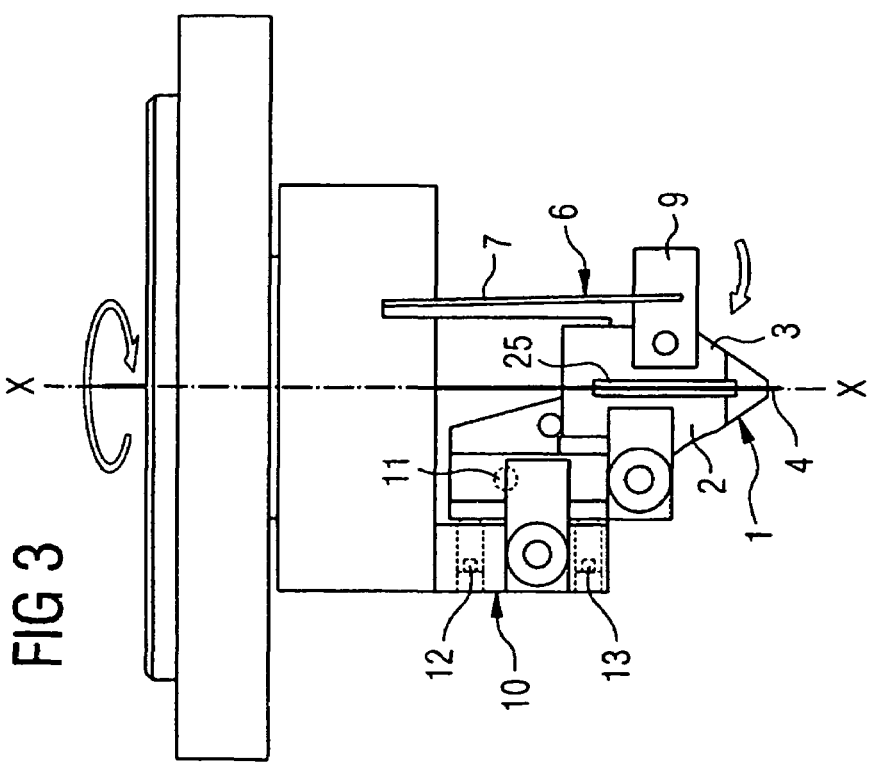

ELECTRODE GUIDE FOR SPARK-EROSION MACHINES AND A METHOD FOR THE SPARK-EROSION OF WORKPIECES

CROSS REFERENCE TO RELATED APPLICATION

This application is a continuation of copending International Application No. PCT/DE02/00260 filed Jan. 25, 2002 which designates the United States, and claims priority to German application number 10103292.7 filed Jan. 25, 2001 and German application number 20120252.2 filed Jan. 25, 2001.

TECHNICAL FIELD OF THE INVENTION

The present invention relates to an electrode guide for spark-erosion machines and a method for the spark-erosion of workpieces

BACKGROUND OF THE INVENTION

A wide variety of spark-erosion machines are known in the prior art. Such machines are used for example to generate bores. In such cases for example ceramic tubes are used as electrode guides or carbide collet chucks with side tensioning mechanisms are used. With these known electrode guides, the tolerances of the tensioned position of the electrode in relation to the axis of rotation are around 5 $\mu$m, which means that they are relatively inaccurate for the generation of microbores.

The production of microbores is particularly problematic and so in particular is the production of conical microbores with accurately defined front or rear widening. It has not as yet been possible to mass-produce such microbores with an acceptable tolerance of 1 $\mu$m. Conical microbores in particular can only be generated subject to adjustments to the erosion parameters. For example conical bores are generated by means of a removal capacity that increases with the depth of the bore or a rotating wire electrode is energized to oscillate as the depth of the bore increases, in order to describe a cone shaped path. However with such methods only bores with inaccurate dimensions and relatively large tolerances of over 5 $\mu$m can be obtained. For example when producing microbores for fuel injection valves, tolerances in the range of 1 $\mu$m would be desirable. There is therefore a need for an electrode guide and a spark-erosion method which achieve such tolerances of 1 $\mu$m.

SUMMARY OF THE INVENTION

It is therefore the object of the present invention to provide an electrode guide or a spark-erosion method which provides play-free guidance with a simple structure and low-cost manufacture, to generate bores or recesses with the smallest possible tolerance.

According to the invention therefore an electrode guide or a guide device for an electrode on a spark-erosion machine is provided, which has a prism-shaped guide comprising a holding component and a pressure component. The electrode is located and guided between the pressure component and the holding component. A grooved recess is configured in the holding component or in the pressure component and the pressure component is pressed against the holding component by means of a pre-tensioning device. In this way according to the invention a defined position can be ensured for the electrode with a tolerance of $\leq 1$ $\mu$m, even when the electrode is advanced during the course of the spark-erosion process, as the electrode is guided in a play-free manner in the electrode guide. With rotating electrodes in particular a concentricity of $\pm 1$ $\mu$m can be accurately achieved. This means that microbores for example can be produced with maximum accuracy. As the grooved recess is configured either in the holding component or in the pressure component, according to the invention a minimum number of contact points can be achieved between the electrode and the electrode guide. It is particularly advantageous to provide three contact points.

A grooved recess is preferably configured both in the pressure component and in the holding component.

In order to have precisely three contact points between the electrode and the electrode guide, the grooved recess is preferably configured with a V-shaped cross-section and is created either only in the holding component or only in the pressure component.

In order to provide reliable and continuous guidance of the electrode in the electrode guide, the pressure component is pressed against the holding component by means of a spring element or by means of a weight. In this way precise guidance can be ensured.

In order to provide optimal pressure forces in every instance for electrodes with different diameters, the pressure force of the pressure component can be adjusted. For example, when the pressure force is provided by means of a weight, this can be arranged so that it can be displaced by means of a lever arm, thereby exerting a different force on the pressure component depending on its position. In order to allow fine adjustment, the weight can preferably be moved via a screw thread. A spring steel sheet for example can also be provided as the spring element, the spring force of which can be adjusted by means of movable stops. The pressure force is selected in each instance so that the spark-erosion process can proceed without malfunction.

The electrode guide is preferably arranged in a rotating manner.

It is particularly preferable for the electrode to be arranged in a rotating manner. If the electrode guide is also arranged in a rotating manner, the electrode preferably rotates at the same speed as the electrode guide.

A pivoting device is also provided to pivot the electrode guide. The electrode guide is then preferably pivoted through an angle of pivot of $\pm 2°$ about an axis in the direction of advance, in which the electrode wire is arranged. In the case of a rotating electrode the axis in the direction of advance and the axis of rotation correspond. The pivoting device can be used to adjust the electrode guide through an angle in relation to the axis of rotation. This means in particular that bores with taper can be generated, with the option of generating both bores which decrease conically from the electrode guide side (bores with front widening) and bores, which increase conically from the electrode guide side (bores with rear widening). The conical bores can be produced with a smooth surface line. This means that bores for injection nozzles in particular can be produced with maximum accuracy according to the invention.

In order to be able to displace the electrode guide parallel to the axis in the direction of advance or parallel to the axis of rotation as well, an alignment device is also preferably provided.

It is particularly preferable for the alignment device to be arranged in a rotating head. The alignment device can then be structured for example so that it has four screws arranged in the rotating head, each of which is in contact with a different side of the electrode guide and which center the electrode guide between them. This means that the position of the electrode guide can be displaced in any radial direction parallel to the axis of rotation of the electrode.

The central area of the pressure component facing the electrode is advantageously configured with a further recess. This means that the electrode is only pressed against the holding component and guided via two areas of the pressure component. In other words the electrode is only pressed against the holding component at both ends of the pressure component.

It is particularly preferable for the electrode guide to be arranged in the rotating head, which is held in a bridge. Precision bearings are then used to hold the rotating head.

The bridge is preferably held by means of play-free spherical guides in a spindle of the spark-erosion machine so that it can be displaced in the direction of the axis.

The electrode guide is preferably located axially between the spindle and the workpiece to be machined.

A stop is advantageously provided to limit bridge advance.

It is particularly preferable for the stop to be adjustable.

In order to allow a simple rotating head structure, the rotating head is preferably driven via a driver on the spindle.

The electrode guide is advantageously made of an $Al_2O_3$ ceramic or carbide or steel.

According to the inventive method for spark-eroding recesses, in particular microbores, in workpieces, an electrode guide has a holding component and a pressure component, with a grooved recess being provided in the holding component and/or in the pressure component. An electrode is arranged between the holding component and the pressure component. The pressure component is pressed against the holding component by means of a pre-tensioning device. The electrode is also arranged in a rotating manner, with only the electrode being advanced for spark-erosion purposes and the electrode guide remaining at a defined distance from the workpiece in the direction of advance. In this way, bores with a tolerance of ±1 μm can be produced according to the invention.

Preferably the electrode guide is arranged in a rotating manner with the inventive method.

Preferably the electrode guide can be pivoted by means of a pivoting device, so that the electrode guide, and therefore also the electrode emerging from the electrode guide, is positioned obliquely in respect of the axis of rotation. This means that conical bores in particular both with front widening and rear widening can be produced with a rotating electrode guide. To produce bores with rear widening, the electrode guide is advanced parallel to the axis of rotation of the electrode, so that the point of entry of the electrode at the workpiece, which has been positioned obliquely by means of the pivoting device, is precisely on the axis of rotation of the electrode guide. If the electrode is now advanced, the rotating electrode describes a spherical surface movement, generating a conical bore with rear widening, with the central axis of the generated bore on the axis of rotation of the electrode guide. When a conical bore with front widening is to be produced, the electrode guide is advanced parallel to the axis of rotation so that an entry position of the electrode into the workpiece is on the large diameter of the bore (27) to be produced. In this way according to the invention for instance conical bores with rear widening of 0 to 100 μm can be produced to a bore depth of 1 mm with a straight surface line. It should be noted that the parallel displacement or pivot of the electrode guide can also be produced by means of an automatic controller and can also be modified during the machining process.

BRIEF DESCRIPTION OF THE DRAWINGS

The invention is described below using preferred embodiments in relation to the drawing. The drawing shows:

FIG. 2 an enlarged sectional representation of the inventive electrode guide shown in FIG. 1;

FIG. 3 an enlarged side view of the electrode guide according to the first exemplary embodiment;

FIG. 4 a schematic representation of the inventive electrode guide for the production of a bore with rear widening;

FIG. 5 a schematic representation of the inventive electrode guide for the production of a bore with front widening;

FIG. 6 an enlarged side view of an electrode guide according to a second exemplary embodiment of the present invention;

DETAILED DESCRIPTION OF THE PREFERRED EMBODIMENTS

A first exemplary embodiment of an inventive electrode guide according to a first exemplary embodiment is described below with reference to FIGS. 1 to 3.

Figure 1:
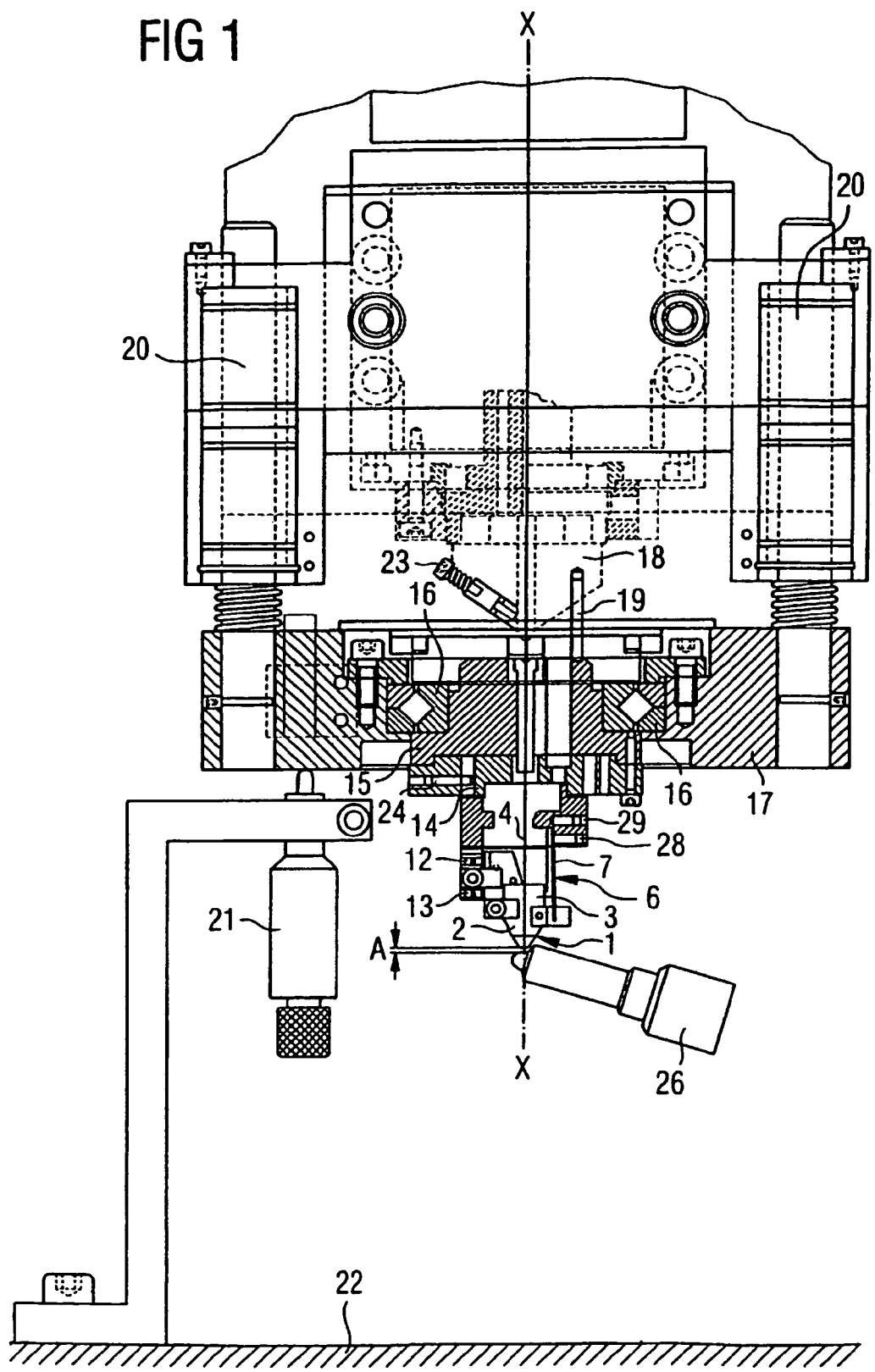
FIG. 1 a schematic sectional view of a spark-erosion machine with an inventive electrode guide according to a first exemplary embodiment of the present invention.

As shown in FIG. 1, the inventive electrode guide 1 has a holding component 2 and a pressure component 3. The pressure component 3 is pressed against the holding component 2 by means of a pre-tensioning device 6. A rotating electrode 4 in the form of a wire is guided between the holding component and the pressure component. The electrode 4 is driven via an electrode spindle 18.

There is a recess 25 (see also FIG. 3) in the pressure component 3, so that the electrode is only in contact with the pressure component 3 at its two ends. As shown in FIG. 2, the holding component 2 has a grooved recess 5, which is configured with a V-shaped cross-section and holds part of the electrode 4. This means that there are precisely three contact points between the electrode guide 1 and the electrode 4.

As shown in particular in FIG. 3, the pre-tensioning device 6 has a spring element 7, the spring force of which acts via a securing device 9 on the pressure component 3. This ensures that the electrode 4 is guided securely in the electrode guide 1 with no possibility of play on the part of the electrode 4 in the electrode guide 1. The strength of the spring force can be adjusted via an adjustment screw 28. A screw 29 is used to secure the spring element.

As shown in FIG. 3, a pivoting device 10 is also provided. The pivoting device 10 has a first screw 12 and a second screw 13. By using the screws for adjustment purposes the electrode guide 1 can be pivoted about a pivot point 11. This means that the electrode guide 1 can be inclined through a specific angle in relation to the axis of rotation X—X of the electrode 4.

An alignment device 14 is also provided, which can be adjusted by means of four adjustment screws 24. Only one adjustment screw 24 is shown in FIG. 1 to simplify the illustration. The alignment device 14 can be used to displace the electrode guide 1 parallel to the axis of rotation X—X.

The electrode guide 1 is located above the alignment device 14 in a rotating head 15. The rotating head 15 is held in a bridge 17 by means of precision bearings 16. The bridge 17 is held with two guide rods by means of play-free spherical guides 20 in the spindle of the spark-erosion machine so that it can be advanced by spring action in the direction of the axis. The spark-erosion spindle 18 then drives the rotating head 15 via a driver 19. As a result the electrode guide 1 also rotates at the same speed as the electrode 4. The electrode 4 can be clamped by means of an electrode clamp 23 and be displaced gradually or continuously out of the electrode guide 1 as a result, to erode a bore in a workpiece 26.

For spark-erosion purposes the bridge 17 comes up against an adjustable stop 21, located at a machine table 22. The distance between the electrode 4 and the workpiece 26 can therefore be adjusted continuously according to the requirements of the spark-erosion process. For spark-erosion purposes the rotating electrode 4 is now advanced by means of the electrode clamp 23. The electrode guide 1, which is also rotating, then remains at a defined distance A from the workpiece 26 (see also FIG. 1). While the electrode is being advanced, the electrode clamp 23 does not influence the position of the electrode in relation to the axis of rotation X—X, so that the concentricity of the electrode 4 can be maintained precisely at $\leq 1$ μm by the electrode guide 1. Nor is the electrode position influenced during the spark-erosion process due to drive action via the drivers 19 by the disconnected spark-erosion spindle 18. This means that microbores in particular can be produced with maximum accuracy. The rotating electrode 4 means that any existing minimal errors of form in the electrode 4 are not transferred to the bore form, as the electrode rotates and thereby improves the circular form of the bore. It should be noted that the inventive electrode guide 1 is also suitable for stationary electrodes and other hole forms or recesses can therefore be produced, e.g. using profiled electrodes.

Also conical bores and in particular conical bores with rear widening can be produced by means of the inventive electrode guide 1 and the inventive method. In the case of conical bores with rear widening, the bore is configured so that the bore diameter increases as the depth of the bore increases. Such a bore 27 with rear widening is shown for example in FIG. 4.

To produce the bore with rear widening shown in FIG. 4, the electrode guide 1 is first pivoted about the pivot point 11 by means of the screws 12, 13 in the pivoting device 10. The extent of the pivot movement depends on the nature of the taper required. Usually the electrode guide 1 is pivoted through an angle α of 0° to approx. 2°. The electrode wire is slightly bent as a result. The electrode guide 1 is then displaced parallel to the axis of rotation X—X by means of the alignment device 14. The electrode guide 1 is advanced parallel to the axis of rotation X—X until the point of entry of the electrode 4 into the workpiece 26 is precisely on the original axis of rotation X—X (see also FIG. 4). The electrode guide 1 therefore rotates about the axis of rotation X—X, with its tip close to the axis of rotation. If the rotating electrode 4 is now advanced, it describes a movement on a spherical surface, which causes a conical bore 27 with rear widening to be generated.

FIG. 5 shows the production of a bore with front widening. In the same way as when a bore with rear widening is produced, the electrode guide 1 is pivoted through an angle α and then displaced parallel to the axis of rotation X—X. This causes parallel displacement of the electrode guide 1 so that the entry point of the electrode 4 into the workpiece 26 is on the outer diameter of the bore 27. The electrode guide 1 therefore rotates at a certain distance about the axis of rotation X—X and describes a movement on an inverted spherical surface (see also FIG. 5). After production of the bore 27 the electrode 4, advanced during spark-erosion, is precisely on the axis of rotation X—X.

As the electrode 4 is also guided continuously by the inventive electrode guide 1 during the production of conical bores, these bores can be produced quickly and easily with an accuracy of 1 μm, which was not possible with the methods known previously from the prior art, which increase or decrease the removal rate as the depth of the bore increases or which cause the electrode to oscillate as the depth of the bore increases. The present invention therefore represents particular progress towards the rational production of bores and in particular microbores using spark-erosion methods.

FIG. 6 shows an electrode guide 1 according to a second exemplary embodiment. Identical components or components with identical functions are shown with the same references as in the first exemplary embodiment.

Unlike the first exemplary embodiment, in the second exemplary embodiment the pre-tensioning device 6 is configured by means of a weight 8. The weight 8 acts via a lever arm and a securing device 9 on the pressure component 3, to press it against the holding component 2 (see also FIG. 6). The weight 8 is configured here as a cylindrical body with an internal through opening. A thread is cut into the through opening, by means of which the weight can be adjusted, so that the active length of the lever arm can be changed and the pressure force of the pressure element 3 can be adjusted. In order not to obstruct the pivot movement of the electrode guide 1, the pre-tensioning device is jointed (see also FIG. 6).

Otherwise the electrode guide 1 of the second exemplary embodiment corresponds to that of the first exemplary embodiment, so there is no need for a further description.

Figure 7:
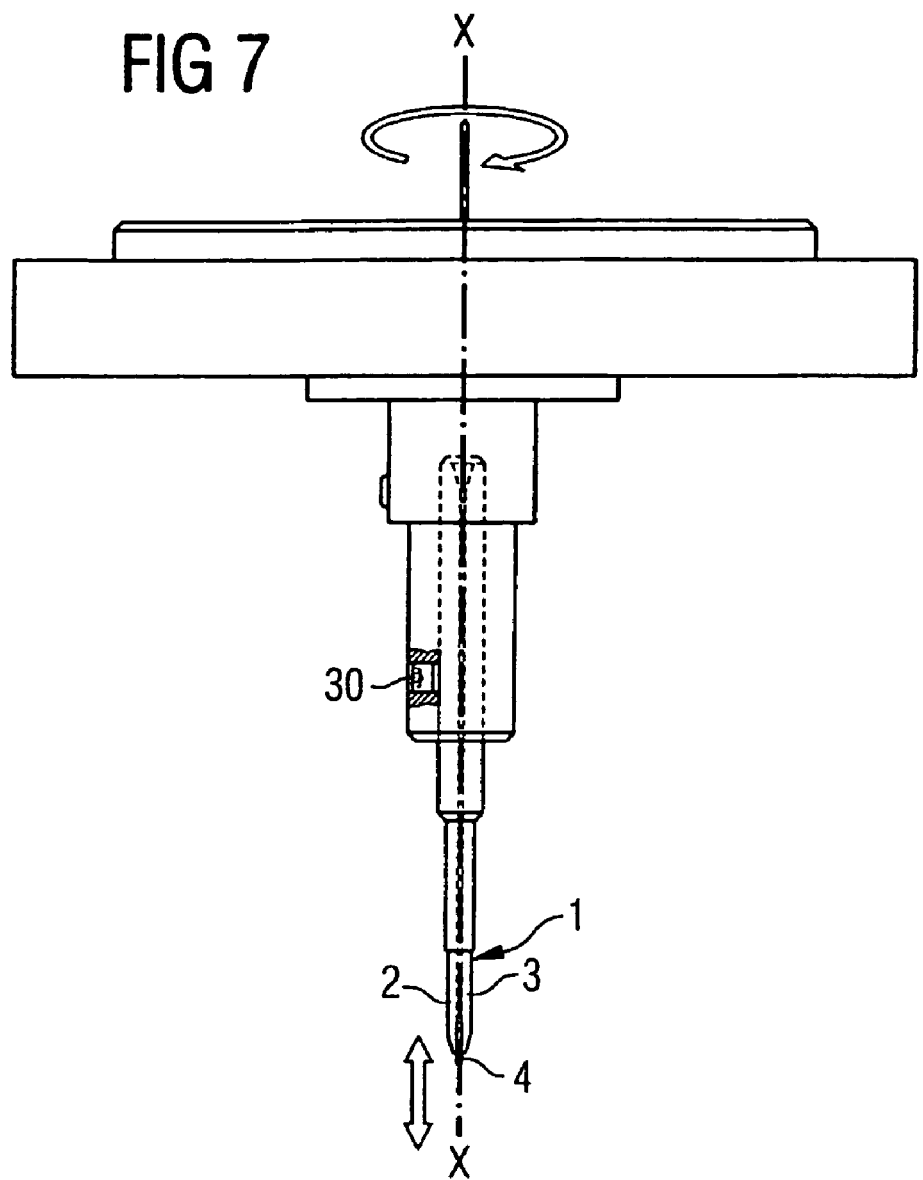
FIG. 7 an enlarged side view of an electrode guide according to a third exemplary embodiment of the present invention.

FIG. 7 shows an electrode guide 1 according to a third exemplary embodiment. Identical components or components with identical functions are shown with the same references as in the first or second exemplary embodiment.

Unlike the exemplary embodiments described above, in the third exemplary embodiment the electrode guide 1 comprising two half-liners 2 and 3 is pre-tensioned by means of an adjustment screw 30. The electrode guide 1 comprises a number of successive cylindrical bodies, each of which has a smaller diameter than the previous cylindrical body. The electrode guide is preferably made up of two cylindrically offset (staged) half-liners. This electrode guide is used in particular to produce cylindrical microbores. Otherwise the electrode guide 1 of the second exemplary embodiment corresponds to that of the first exemplary embodiment, so there is no need for a further description.

Figure 8:
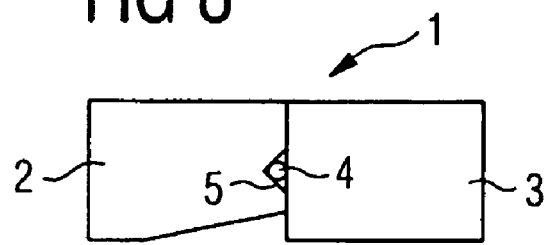
FIG. 8 a top view of an inventive electrode guide according to a fourth exemplary embodiment of the present invention.

FIG. 8 shows an electrode guide 1 according to a fourth exemplary embodiment. Identical components or components with identical functions are shown with the same references as in the previously described exemplary embodiments.

Unlike the exemplary embodiments described above, in which the electrode guide 1 has a cylindrical outer form (see also FIG. 7), the electrode guide 1 in this exemplary embodiment has a rectangular form. It should be noted that other external forms, e.g. triangular, are also possible, depending on the recess to be generated.

To summarize, the present invention relates to an electrode guide 1 or a method for the spark-erosion of workpieces. Said electrode guide 1, consisting of a two-piece, prism-shaped 2, 3 guide with a pre-tensioning device 6, enables an electrode 4 to be guided in a play-free manner, thus allowing the production of bores that is accurate to within 1 µm. A pivoting device 10 for pivoting the electrode guide 1 and an alignment device 14 for the parallel displacement of said electrode guide 1 are also provided, enabling the production of conical bores.

The above description of the exemplary embodiments according to the present invention serves only for illustration purposes and not to restrict the invention. Various changes and modifications are possible within the context of the invention, without departing from the scope of the invention and its equivalents.

What is claimed is:

1. An electrode guide for an electrode in a spark-erosion machine, said guide comprising;
    a holding component and a pressure component;
    a grooved recess configured in the holding component and the pressure component being pre-tensioned against the holding component by a pre-tensioning device and the electrode being arranged and guided in a play-free manner between the pressure component and the holding component; and
    the electrode arranged in a rotating manner.

2. An electrode guide according to claim 1 further comprising a recess configured in the pressure component.

3. An electrode guide according to claim 1, wherein the grooved recess has a V-shaped cross-section.

4. An electrode guide according to claim 1 wherein the pre-tensioning device for pressing the pressure component against the holding component is selected from the group consisting of a spring element and a weight.

5. An electrode guide according to claim 1, wherein the pressure force of the pressure component comprises an adjustable force.

6. An electrode guide according to claim 1, wherein the electrode guide is arranged in a rotating manner.

7. An electrode guide according to claim 1, wherein the electrode guide is arranged axially between the spindle and a workpiece to be machined.

8. An electrode guide according to claim 1, wherein the electrode guide also has a pivoting device to pivot the electrode guide.

9. An electrode guide according to claim 1 further comprising an alignment device provided to displace the electrode guide parallel to an axis of rotation.

10. An electrode guide according to claim 9, wherein the alignment device is arranged in a rotating head.

11. An electrode guide according to claim 10, wherein the rotating head is driven via a driver on a spindle.

12. An electrode guide according to claim 1, wherein the electrode guide is arranged in a rotating head, the rotating head held in a bridge.

13. An electrode guide according to claim 12, wherein the bridge is held by means of play-free spherical guides in a spindle of the spark-erosion machine so that it can be displaced in the direction of the axis.

14. An electrode guide according to claim 12 further comprising a stop provided to limit the advance of the bridge.

15. An electrode guide according to claim 14, wherein the stop is arranged in an adjustable manner.

16. An electrode guide according to claim 1, wherein the pressure component has a further recess in its central area facing the electrode.

17. An electrode guide according to claim 1, wherein the electrode guide is made of a material selected from the group consisting of $Al_2O_3$ ceramic carbide and steel.

18. An electrode guide for an electrode in a spark-erosion machine, said guide comprising:
    a holding component and a pressure component;
    a grooved recess configured in the holding component the pressure component being pre-tensioned against the holding component by a pre-tensioning device and the electrode being arranged and guided in a play-free manner between the pressure component and the holding component; and
    a recess configured in the pressure component.

19. A method for spark-eroding recesses in workpieces, said method comprising:
    providing an electrode guide with a holding component and a pressure component, with a grooved recess being provided in the holding component and/or in the pressure component;
    arranging and guiding an electrode in a play-free manner between the holding component and the pressure component;
    arranging the electrode in a rotating manner;
    pressing the pressure component against the holding component by means of a pre-tensioning device; and
    advancing only the electrode for spark-erosion purposes and maintaining the electrode guide at a defined distance from the workpiece in the direction of advance.

20. A method according to claim 19, wherein the electrode guide arranged in a rotating manner.

21. A method according to claim 19, wherein the electrode guide is arranged axially between a spindle and the workpiece.

22. A method according to claim 19, wherein the electrode guide is pivoted by a pivoting device such that the electrode guide is positioned obliquely in respect of the axis of rotation.

23. A method according to claim 19, wherein the electrode guide is operable to be displaced parallel to the axis of rotation to produce conical bores, such that the position of entry of the electrode into the workpiece is at the intersection of the axis of rotation and the workpiece or on the large diameter of the bore to be produced.

24. An electrode guide for an electrode in a spark-erosion machine, said guide comprising:
    a holding component and a pressure component;
    a grooved recess configured in the pressure component, the pressure component being pre-tensioned against the holding component by a pre-tensioning device and the electrode being arranged and guided in a play-free manner between the pressure component and the holding component; and
    the electrode arranged in a rotating manner.

* * * * *

UNITED STATES PATENT AND TRADEMARK OFFICE
CERTIFICATE OF CORRECTION

PATENT NO. : 7,009,134 B2
DATED : March 7, 2006
INVENTOR(S) : Stephan Aurich et al.

It is certified that error appears in the above-identified patent and that said Letters Patent is hereby corrected as shown below:

<u>Title page,</u>
Item [30], Foreign Application Priority Data, add:
-- Jan. 25, 2001   (DE)      201 20 252 --.

Signed and Sealed this

Sixth Day of June, 2006

JON W. DUDAS
*Director of the United States Patent and Trademark Office*